(12) United States Patent
Majjiga et al.

(10) Patent No.: US 12,375,452 B2
(45) Date of Patent: Jul. 29, 2025

(54) METHOD AND SYSTEM FOR SECURE OPERATIONS, ADMINISTRATION, AND MANAGEMENT FOR REMOTE NETWORKS

(71) Applicant: Verizon Patent and Licensing Inc., Basking Ridge, NJ (US)

(72) Inventors: Deepak Majjiga, Tirupati West (IN); Jason T. Wright, Novi, MI (US); Abhishek Kumar, Irving, TX (US); Neeraj Bhatt, Vienna, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 380 days.

(21) Appl. No.: 18/058,325

(22) Filed: Nov. 23, 2022

(65) Prior Publication Data

US 2024/0171545 A1 May 23, 2024

(51) Int. Cl.
*H04L 9/40* (2022.01)

(52) U.S. Cl.
CPC .......... *H04L 63/0272* (2013.01); *H04L 63/20* (2013.01)

(58) Field of Classification Search
CPC ............................ H04L 63/0272; H04L 63/20
See application file for complete search history.

(56) References Cited

U.S. PATENT DOCUMENTS

| | | | |
|---|---|---|---|
| 2017/0337534 A1* | 11/2017 | Goeringer | G06Q 20/06 |
| 2020/0126321 A1* | 4/2020 | Swearingen | G07C 5/085 |
| 2020/0366653 A1* | 11/2020 | Caceres | H04L 63/0853 |
| 2022/0318122 A1* | 10/2022 | Hughes | H04L 9/0643 |
| 2023/0022330 A1* | 1/2023 | Crowley | G06F 3/0689 |
| 2024/0004850 A1* | 1/2024 | Beal | G06F 21/64 |

\* cited by examiner

Primary Examiner — Abiy Getachew (57) ABSTRACT

A method, a network device, and a non-transitory computer-readable storage medium are described in relation to a secure operations, administration, and management (OAM) for remote networks service. The service may categorize performance metric (PM), fault metric (FM) data, and other types of data associated with a virtualized network device of a private network and provide such data to an OAM system of an operator network via a blockchain network or not based on the categorization. The OAM system may also manage orchestration and maintenance of the private network including the virtualized network device based on configuration data transmitted via the blockchain network or not. The virtualized network device may be a radio access network device, a core network device, or an edge server device. The secure OAM for remote networks service may also store service assurance policies as a smart contract in the blockchain network.

20 Claims, 9 Drawing Sheets

Fig. 5B

METHOD AND SYSTEM FOR SECURE OPERATIONS, ADMINISTRATION, AND MANAGEMENT FOR REMOTE NETWORKS

BACKGROUND

Network management presents various complexities due to the enumerable relevant factors to consider as well as their dynamic nature. In the case of private or enterprise networks, network functions are orchestrated and operated by an operator's network that is outside of the private or enterprise network.

DETAILED DESCRIPTION

The following detailed description refers to the accompanying drawings. The same reference numbers in different drawings may identify the same or similar elements. Also, the following detailed description does not limit the invention.

In a private and/or enterprise (referred to as private/enterprise) network environment, various network devices, network elements, or network functions (referred to as network devices) are managed centrally within an operator's network. For example, the network devices may include radio access network (RAN) devices, core network devices, mobile edge computing (MEC) network devices, and/or other types of private/enterprise network devices. As such, the process to design, build, and operate a Fifth Generation (5G) and/or another generation network adds complexity and concerns regarding security for various entities, such as carriers, enterprises, private network owners, and so forth. In particular, a private/enterprise network deployment includes the orchestration and automation of RAN, core, and edge functions in various locations, pertaining to various industries, for various entities, etc., that are outside of the operator's network (e.g., cloud network). For example, the managerial tasks for a private/enterprise network may include the management of operations, administration, and management (OAM) functions via remote centralized orchestration tools, the monitoring and enforcement of service assurance policies, the monitoring and enforcement of security management policies, and the provisioning of zero trust protection for OAM functions, as well as affording protection to the operator's network.

According to exemplary embodiments, a secure OAM for remote networks service is described. According to an exemplary embodiment, the secure OAM for remote networks service may include a service, which may be provided by RAN, core, edge, and/or other types of private/enterprise network devices, that categorizes metrics (e.g., fault metrics (FM), performance metrics (PM), and/or another type of metric data) and service assurance policies (SAPs) into at least two different types. For example, the categories may include a critical category and a non-critical category. According to other examples, the categories may be configured with different nomenclatures (e.g., secure and non-secure, etc.). According to an exemplary embodiment, the service of the secure OAM for remote networks service may subject data of one category to a blockchain service while another category of data may forego the blockchain service. For example, critical data may be subject to the blockchain service and non-critical data may not be subject to the blockchain service.

According to an exemplary embodiment, the secure OAM for remote networks service may include a service, which may be provided by a remote management and operation system, that categorizes control data into at least two different and corresponding types as mentioned above. According to an exemplary embodiment, the service may subject data of one category (e.g., critical data) to the blockchain service while another category of data (e.g., non-critical data) may forego the blockchain service.

According to an exemplary embodiment, the secure OAM for remote networks service may include a blockchain node hosted by a private/enterprise network and another blockchain node hosted by a remote operator's network, as described herein. For example, the blockchain nodes (e.g., clients) may form a blockchain network that may enable a private/enterprise network to join a permissioned blockchain network and share allowed data (e.g., categorized data) to be stored in a blockchain, replicated, and so forth. According to an exemplary embodiment, SAPs may be stored as smart contracts in a permissioned blockchain, and RAN, core, edge, and OAM network devices may subscribe to the SAP smart contracts and utilize them to provide the necessary assurance and/or optimization actions.

According to some exemplary embodiments, the secure OAM for remote networks service may be implemented as a microservice. For example, the microservice may be internal to an application that provides a function of the network devices, as described herein, such as a RAN function, a core network function, an edge function, or an OAM function. According to other exemplary embodiments, the secure OAM for remote networks service may be implemented as sidecar logic. For example, the sidecar logic or lightweight agent may be external to the application that provides a function of the network devices, as described herein, such as the RAN function, a core network function, an edge function, or an OAM function. According to an exemplary embodiment, the microservice or the sidecar/agent may include logic that identifies and/or categories data and may apply the appropriate data to the blockchain service, as described herein.

According to an exemplary embodiment, the secure OAM for remote networks service may establish cryptographically secure permissioned peer-to-peer network architecture of multiple private/enterprise networks and operator networks.

In view of the foregoing, the secure OAM for remote networks service may enhance the capabilities in a network function virtualization (NFV) management and orchestration architecture framework and secure the systems from malicious attacks, prevent any infringement of SAPs, and automate the provisioning, maintenance, and supervision across remote network devices in a private/enterprise environment.

Figure 1:
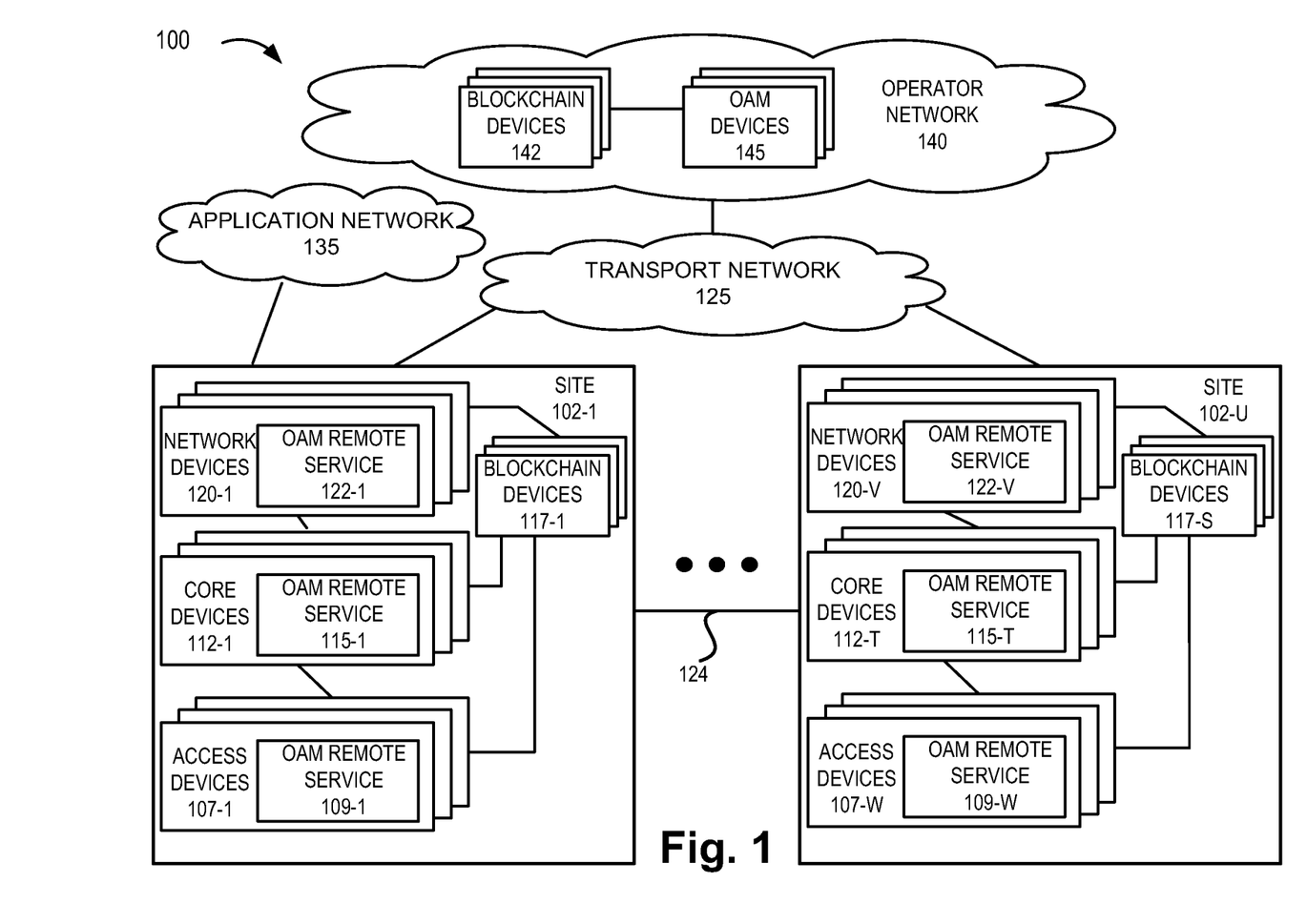
FIG. 1 is a diagram illustrating an exemplary environment in which an exemplary embodiment of an secure operations, administration, and management (OAM) for remote networks service may be implemented.

FIG. 1 is a diagram illustrating an exemplary environment 100 in which an exemplary embodiment of a secure OAM for remote networks service may be implemented. As illustrated, environment 100 includes sites 102-1 through 102-U (also referred to collectively as sites 102, and individually or generally as site 102), a set of access devices 107-1 through 107-W (also referred to collectively as access devices 107, and individually or generally as access device 107), core devices 112-1 through 112-T (also referred to collectively as core devices 112, and individually or generally as core device 112), blockchain devices 117-1 through 117-S (also referred to collectively as blockchain devices 117, and individually or generally as blockchain device 117), and network devices 120-1 through 120-V (also referred to collectively as network devices 120, and individually or generally as network device 120). As further illustrated, environment 100 includes a transport network 125, an application network 135, and an operator network 140. Operator network 140 may include blockchain devices 142 and OAM devices 145.

The number, type, and arrangement of networks illustrated in environment 100 are exemplary. For example, according to other exemplary embodiments, environment 100 may include fewer networks, additional networks, and/or different networks. The number, type, and arrangement of network devices illustrated in environment 100 are exemplary. Although not illustrated, site 102 may include end devices. For example, an end device may include a device that has communication capabilities (e.g., wireless, wired, optical, etc.). The end device may or may not have computational capabilities. The end device may be implemented as a mobile device, a portable device, a stationary device (e.g., a non-mobile device and/or a non-portable device), a device operated by a user, or a device not operated by a user. For example, end device may be implemented as a smartphone, a mobile phone, a tablet, a wearable device (e.g., a watch, glasses, etc.), a video camera, a computer, an Internet of Thing (IoT) device, an industrial robot, a sensor device, or another type of user equipment (UE). The end device may be configured to execute one or multiple types of software (e.g., applications, programs, etc.). The number and the types of software may vary among end devices. For purposes of description, the end device is not considered a network device.

A network device may be implemented according to one or multiple network architectures, such as a client device, a server device, a peer device, a proxy device, a cloud device, edge, fog, and/or a virtualized network device. Additionally, a network device may be implemented according to various computing architectures, such as centralized, distributed, cloud, edge, and/or another type of computing architecture, and may be incorporated into various types of network architectures (e.g., Software Defined Networking (SDN), virtual, logical, network slice, etc.).

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. The secure OAM for remote networks service may use one or more of these planes of communication.

Site 102 may be implemented as a private or enterprise location in which the secure OAM for remote networks service may be provided. For example, site 102 may host various network devices, as described herein, such as access device 107, core device 112, blockchain device 117, and network device 120. As an example, site 102 may include a factory, a warehouse, a retail venue, a manufacturing plant, a hospital, and the like.

Site 102 may include an access network, such as a RAN. The RAN may include access device 107. According to various exemplary embodiments, access device 107 may be implemented as a next generation Node B (gNB), an evolved Long Term Evolution evolved Node B (eLTE eNB), an eNB, a small cell node (e.g., a picocell device, a femtocell device, a microcell device, etc.), a remote radio head (RRH), a baseband unit (BBU), a radio unit (RU), a remote radio unit (RRU), a centralized unit (CU), a distributed unit (DU), a 5G ultra-wide band (UWB) node, a wireless relay device, an open network device (e.g., O-RAN Centralized Unit (O-CU), O-RAN Distributed Unit (O-DU), O-RAN next generation Node B (O-gNB), O-RAN evolved Node B (O-eNB)) a future generation wireless access device (e.g., a 6G wireless station, a 7G wireless station, or another generation of wireless station).

Access device 107 may include other types of wireless nodes (e.g., a Wi-Fi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to an exemplary embodiment, at least some of access devices 107 are virtual network devices. Access device 107 may be virtualized according to various virtualization technologies, which may include a virtual machine (VM), a container, a pod, a host device, a hypervisor, an operating system, and/or another type of virtualization element, layer, or component. The virtualization technology may also be implemented based on other known (e.g., proprietary, hybrid, etc.) network function virtualization (NFV) or future generation virtualization.

According to an exemplary embodiment, at least some of access devices 107 may include logic of the secure OAM for remote networks service, as described herein. For example, as illustrated, access devices 107 may include OAM remote service 109-1 through OAM remote service 109-W (also referred to collectively as OAM remote services 109, and individually or generally as OAM remote service 109). According to various exemplary embodiments, OAM remote service 109 may be implemented as a microservice or sidecar/agent logic.

According to an exemplary embodiment, OAM remote service 109 may categorize data pertaining to the operation of access device 107. For example, the data may include PM data, FM data, and/or other types of data that may contribute to the configuration and operation of access device 107. A further description of the exemplary data is provided herein. OAM remote service 109 may transmit and receive messages pertaining to the secure OAM for remote networks service, as described herein. For example, OAM remote service 109 may use a blockchain service for certain categorized data to communicate with network devices of operator network 140 and not use the blockchain service for other categorized data. Additionally, for example, access device 107 may be orchestrated and managed by OAM devices 145 of operator network 140, as described herein. OAM remote service 109 may also include subscribing to critical SAPs, for example, available from the blockchain network, and using the critical SAPs to modify the configuration of access device 107.

Site 102 may include a core network. For example, core network may include core devices 112. For example, core device 112 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), a home subscriber server (HSS), an enhanced packet data gateway (ePDG), a serving gateway (SGW), a home agent (HA), a home subscriber server (HSS), an authentication, authorization, and accounting (AAA) server, a policy and charging rules function (PCRF), a policy and charging enforcement function (PCEF), or a charging system (CS).

Core device 112 may include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core device 112 may include a split core device, such as a session management (SM) PCF, an access management (AM) PCF, a user equipment (UE) PCF, and/or another type of split architecture associated with another core device 112, as described herein.

According to an exemplary embodiment, at least some of core devices 112 are virtual network devices. According to an exemplary embodiment, at least some of core devices 112 may include logic of the secure OAM for remote networks service, as described herein. For example, as illustrated, core devices 112 may include OAM remote service 115-1 through OAM remote service 115-T (also referred to collectively as OAM remote services 115, and individually or generally as OAM remote service 115). According to various exemplary embodiments, OAM remote service 115 may be implemented as a microservice or sidecar/agent logic.

According to an exemplary embodiment, OAM remote service 115 may categorize data pertaining to the operation of core device 112. For example, the data may include PM data, FM data, and/or other types of data that may contribute to the configuration and operation of access device 107. A further description of the exemplary data is provided herein. Similar to OAM remote service 109, OAM remote service 115 may transmit and receive messages pertaining to the secure OAM for remote networks service, as described herein. For example, OAM remote service 115 may use a blockchain service for certain categorized data to communicate with network devices of operator network 140 and not use the blockchain service for other categorized data. Additionally, for example, core device 112 may be orchestrated and managed by OAM devices 145 of operator network 140, as described herein. OAM remote service 115 may also include subscribing to critical SAPs, for example, available from the blockchain network, and using the critical SAPs to modify the configuration of core device 112.

Blockchain devices 117 may include network devices that provide a blockchain service and provide the secure OAM for remote networks service. According to an exemplary embodiment, blockchain devices 117 (and blockchain devices 142) may be implemented according to a permissioned blockchain architecture. For example, the blockchain network may be implemented according to Hyperledger Fabric architecture or another suitable enterprise-grade, carrier-grade, and/or permission-based blockchain platform. According to an exemplary embodiment, the blockchain service may include the storage of SAPs as smart contracts. According to an exemplary embodiment, access device 107, core device 112, and network device 120 may subscribe to SAP smart contracts and configuration data. According to an exemplary embodiment, blockchain devices 117 may communicate with OAM remote service 109, OAM remote service 115, and OAM remote service 122 to obtain categorized data, such as categorized PM data, categorized FM data, and/or other types of categorized data (e.g., critical data) that may contribute to the configuration and operation of access device 107, core device 112, and network device 120. Blockchain devices 117 may communicate the categorized data to OAM devices 145 via blockchain devices 142. Additionally, blockchain devices 117 may receive categorized configuration data (e.g., critical) from OAM devices 145 via blockchain devices 142. Blockchain devices 117 may provide or make available the categorized configuration data to access device 107, core device 112, and network device 120.

Network devices 120 may include network devices of a MEC network and/or platform. The MEC network may be implemented using one or multiple technologies including, for example, NFV, containers, SDN, cloud computing, Infrastructure-as-a-Service (IaaS), Platform-as-a-Service (PaaS), Software-as-a-Service (SaaS), or another type of network technology. Network devices 120 may include virtual network devices (e.g., virtualized network functions (VNFs), servers, hosts, containers, pods, hypervisors, VMs, network function virtualization infrastructure (NFVI), and/or other types of virtualization elements, layers, hardware resources, operating systems, engines, etc.) and associated applications services for use by end devices. According to some exemplary implementations, network devices 120 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and network resources (e.g., storage devices, communication links, etc.). According to other exemplary implementations, for example, MEC servers may be managed, orchestrated, etc., directly from OAM devices 145 of operator network 140.

Network devices 120 may include a security device. For example, the security device may include a firewall and/or other types of security devices (e.g., authentication device, authorization device, etc.). Network devices 120 may include other types of network devices, such as a switch (e.g., top of rack (ToR) switch, end of rack (EoR) switch), a router, and/or a load balancer.

According to an exemplary embodiment, at least some of network devices 120 are virtual network devices. According to an exemplary embodiment, at least some of network devices 120 may include logic of the secure OAM for remote networks service, as described herein. For example, as illustrated, network devices 120 may include OAM remote service 122-1 through OAM remote service 122-V (also referred to collectively as OAM remote services 117, and individually or generally as OAM remote service 122). According to various exemplary embodiments, OAM remote service 122 may be implemented as a microservice or sidecar/agent logic.

According to an exemplary embodiment, OAM remote service 122 may categorize data pertaining to the operation of network device 120. For example, the data may include PM data, FM data, and/or other types of data that may contribute to the configuration and operation of network device 120. A further description of the exemplary data is provided herein. Similar to OAM remote service 109, OAM remote service 122 may transmit and receive messages pertaining to the secure OAM for remote networks service, as described herein. For example, OAM remote service 122 may use a blockchain service for certain categorized data to communicate with network devices of operator network 140 and not use the blockchain service for other categorized data. Additionally, for example, network device 120 may be orchestrated and managed by OAM devices 145 of operator network 140, as described herein. OAM remote service 122 may also include subscribing to critical SAPs, for example, available from the blockchain network, and using the critical SAPs to modify the configuration of network device 120.

Network link 124 may support communication between sites 102. For example, network link 124 may include a wide area network (WAN), a metropolitan area network (MAN), a virtual private network (VPN), an Internet Protocol (IP) network, an enterprise network, and/or another type of suitable transport and/or data network.

Transport network 125 may include an X-haul network (e.g., backhaul, fronthaul, etc.) and/or another suitable transport and/or intermediary network. Transport network 125 may support communication between sites 102 and operator network 140. Application network 135 may include a public network, the Internet, a packet data network (PDN), a service provider network, the World Wide Web (WWW), an Internet Protocol Multimedia Subsystem (IMS) network, a public cloud network, a Rich Communication Service (RCS) network, a software-defined (SD) network, a virtual network, a data center, a data network, or other type of network that may provide access to and/or may host an end device application, service, or asset (also referred to as an "application service").

Operator network 140 may include one or multiple types of networks. For example, operator network 140 may include a public network, a RAN, a core network, and an application network similar to those previously described. According to an exemplary embodiment, operator network 140 includes an OAM network that includes OAM devices 145, as described herein. According to an exemplary embodiment, operator network 140 provides the blockchain service and the secure OAM for remote networks service, as described herein. Operator network 140 further includes blockchain devices 142 of a blockchain network.

Blockchain devices 142 may include network devices that provide a blockchain service and provide the secure OAM for remote networks service. For example, as mentioned herein, blockchain devices 142 may form a blockchain network with blockchain devices 117. Blockchain devices 142 may obtain categorized data from blockchain devices 117 and provide or make available such data to OAM devices 145. Additionally, blockchain devices 142 may receive categorized configuration data (e.g., critical) from OAM devices 145 and communicate this data to blockchain devices 117. Additionally, as previously mentioned, according to an exemplary embodiment, blockchain device 142 may store SAPs as smart contracts and blockchain devices 117 may store at least a portion of the SAPs (e.g., configuration data to model a SAP, etc.). The smart contracts may be provisioned as a part of an initial on-boarding of site 102 with operator network 140, for example. The configuration data of a SAP may be executed by a VNF (e.g., access device 107, core device 112, etc.) or OAM device 145.

OAM devices 145 may include network devices that provide an exemplary embodiment of the secure OAM for remote networks service, as described herein. According to an exemplary embodiment, OAM devices 145 may include logic that provide orchestration and management services. For example, the orchestration, administration, and management services may include service orchestration, service assurance, inventory service, orchestration security, policy service, and service designer center (SDC). According to various exemplary embodiments, OAM devices 145 may be implemented to include a network device of a management and orchestration (MANO) architecture standard (e.g., European Telecommunications Standards Institute (ETSI)) and/or a non-standard or proprietary architecture. As an example, OAM device 145 may include network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and network resources (e.g., storage devices, communication links, etc.). By way of further example, OAM devices 145 may bind and supervise network devices of site 102, automate configuration and lifecycles (e.g., instantiation, termination) of virtual network devices, manage auto-scaling (e.g., vertical, horizontal, etc.) and upgrades, provide service level agreement (SLA) management, alarm and health monitoring and management, among other services in relation to service orchestration, service assurance, inventory, policy, security, and so forth. OAM devices 145 may store non-critical SAPs while critical SAPs may be stored in blockchain devices 142 and accessible to OAM devices 145 through a subscription. Additionally, as described herein, a VNF (e.g., access device 107, core device 112, etc.) may subscribe to critical SAPs in blockchain network.

Figure 2A:
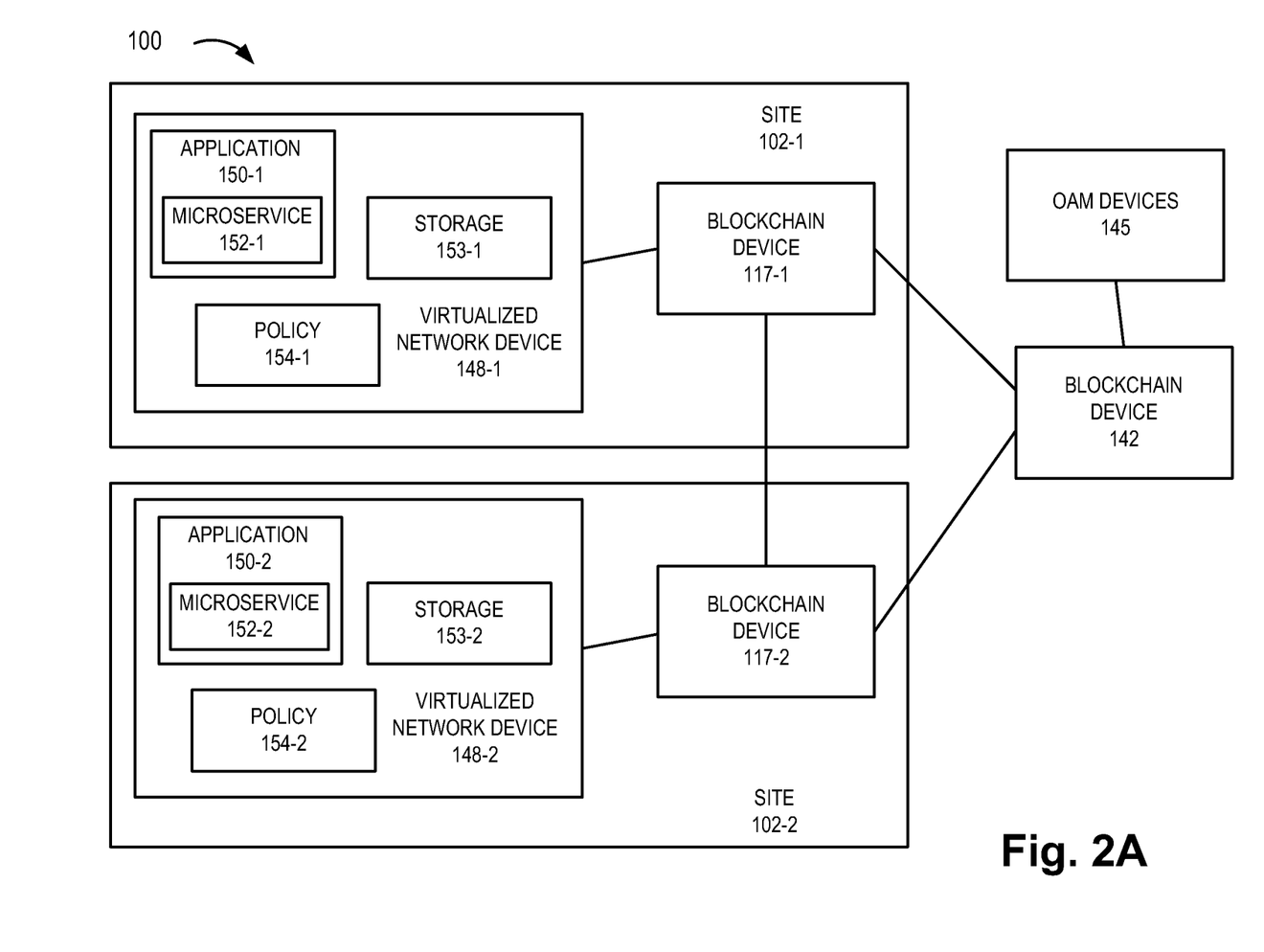
FIG. 2A is a diagram illustrating exemplary components of an exemplary embodiment of the secure OAM for remote networks service.

FIG. 2A is a diagram illustrating exemplary components of an exemplary embodiment of the secure OAM for remote networks service. Referring to FIG. 2A, a site 102-1 may include a virtualized network device 148-1 and a site 102-2 may include a virtualized network device 148-2. Virtualized network devices 148-1 and 148-2 (also referred to collectively as virtualized network devices 148, and individually or generally as virtualized network device 148) may each be implemented to include access device 107, core device 112, or network device 120. According to an exemplary embodiment, the virtualization of access device 107, core device, and network device 120 may include an application (e.g., application 150), a storage (e.g., storage 152), and a policy (e.g., policy 154), such that virtualized network device 148-1 includes application 150-1, storage 153-1, and policy 154-1, and virtualized network device 148-2 includes application 150-2, storage 153-2, and policy 154-2.

Application 150 may include software, firmware, a program, an application, and/or another type of executable that provides a network service. For example, application 150 of a virtualized access device 107, such as an eNB or a gNB, may provide eNB or gNB functionalities associated with this type of network device. According to another example, application 150 of core device 112, such as a UPF or an MME, may provide UPF or MME functionalities associated with this type of network device. Application 150 may include logic that enables a network device, such as the eNB, the gNB, the UPF, or the MME to operate or provide network services according to or specified by a standards body, such as Third Generation Partnership Project (3GPP), 3GPP2, International Telecommunication Union (ITU), European Telecommunications Standards Institute (ETSI), GSM Association (GSMA), and the like. Additionally, or alternatively, application 150 may enable the network device to operate or provide network services in a non-standard or proprietary manner (e.g., relative to 3GPP and the like).

According to exemplary embodiment, the secure OAM for remote networks service may be implemented as a part of application 150. For example, application 150 may include a microservice 152 that provides OAM remote service 109, OAM remote service 115, or OAM remote service 122 associated with access device 107, core device 112, or network device 120, as described herein. As illustrated, application 150-1 may include a microservice 152-1 and application 150-2 may include a microservice 152-2. According to various exemplary embodiments, application 150 may be implemented in a virtualized element, such as a pod, a VM, or a container. Similarly, storage 152 and policy 154 may be implemented as a virtualized element, such as a pod, a VM, or a container.

Storage 153 may store FM data, PM data, and other types of data that may be collected during the operation of virtualized network device 148. Policy 154 may store policies that may be based on the FM data, the PM data, and other types of data, as described herein. For example, policy 154 may include monitoring parameters used for the monitoring, calculation, and/or collection of the FM data, the PM data, and so forth. Policy 154 may include profiles relating to different applications, network slices, end devices, etc., as described herein, in which virtualized network device 148 may monitor for the FM events/data, the PM data, etc.

Figure 2B:
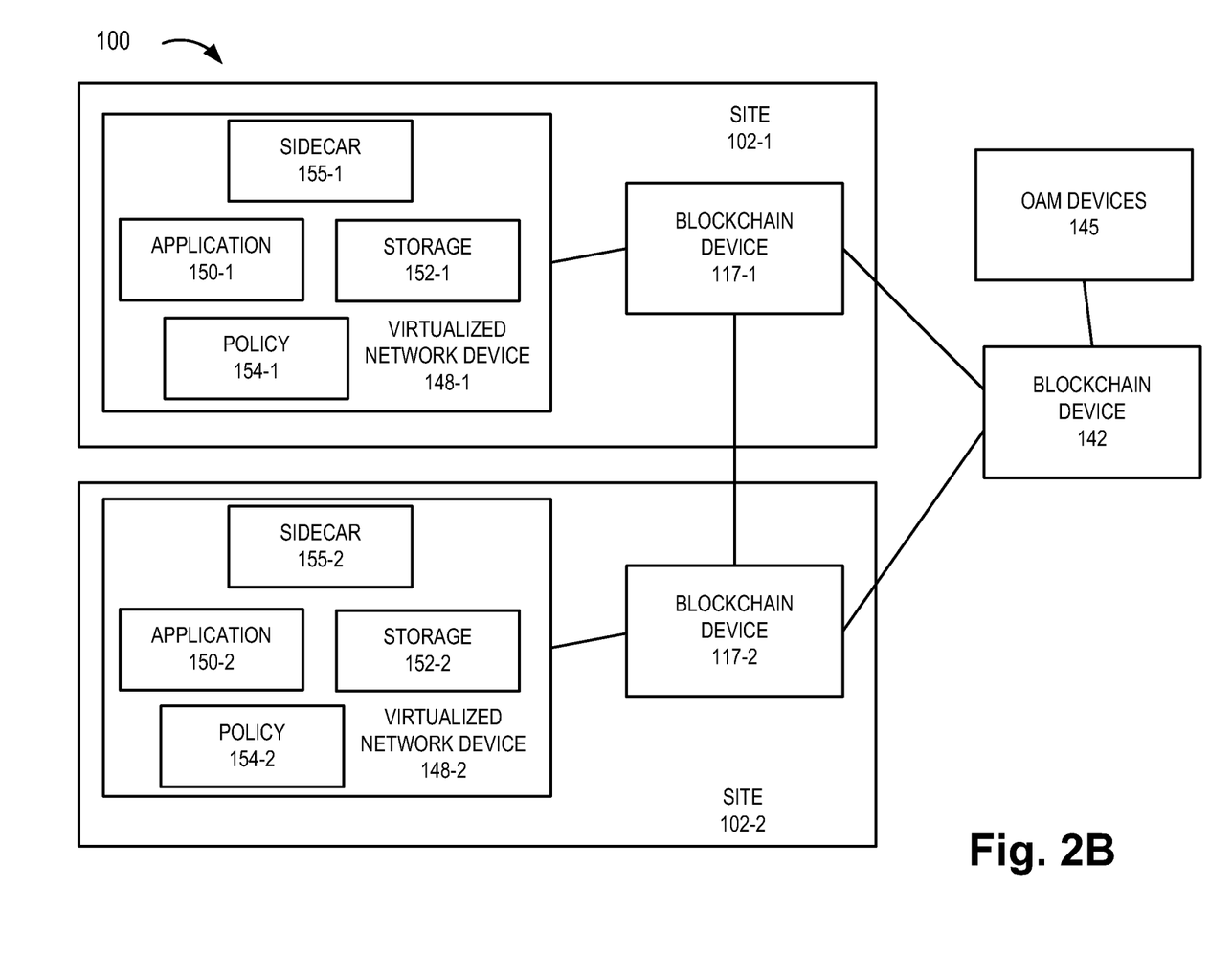
FIG. 2B is a diagram illustrating exemplary components of another exemplary embodiment of the secure OAM for remote networks service.

FIG. 2B is a diagram illustrating exemplary components of another exemplary embodiment of the secure OAM for remote networks service. In contrast to FIG. 2A, FIG. 2B depicts that virtualized network device 148 includes a sidecar (or agent) 155 that may provide the secure OAM for remote networks service, as described herein. For example, virtualized network device 148-1 may include a sidecar 155-1 and virtualized network device 148-2 may include a sidecar 155-2. Sidecar 155 may provide the secure OAM for remote networks service, as described herein.

As previously described, the secure OAM for remote networks service may categorize data and the blockchain service of the secure OAM for remote networks service may include storing SAPs as smart contracts. The SAPs may include a variety of policies, metrics, and/or parameters relating to quality of service (QoS), key performance indicators (KPIs), service level agreement (SLA), quality of experience (QoE), mean opinion score (MOS), and/or another type of performance metric parameter and value. For example, the SAPs may include service assurance in relation to application performance (e.g., memory utilization, central processing unit (CPU) utilization, storage utilization, network utilization, task switching), application latency (e.g., end-to-end (E2E) UE to application latency, application to application latency), network performance (e.g., E2E network latency, E2E and/or MEC to MEC latency, E2E and/or MEC to MEC jitter, E2E and/or MEC to MEC packet drop), application budget, and application requirements (e.g., platform services, such as database services, data streaming services, network services (e.g., firewall, load balancer), graphic processing unit (GPU)). Additionally, for example, the SAPs may include service assurance in relation to accessibility (e.g., number of subscribers supported for a network slice, registration success rate of a network slice), integrity (e.g., downlink and uplink delay in next generation (NG) RAN for a network slice subnet, downlink and uplink delay in gNB-DU for a network slice subnet, downlink and uplink delay in gNB-CU-UP for a network slice subnet, average E2E uplink and downlink delay for a network slice, packet drop rate, jitter, security), utilization (e.g., PDU session establishment time of a network slice, mean number of successful periodic registration updates of a network slice, network slice uptime, bandwidth utilization per network slice, over network slice loading), retainability (e.g., QoS flow retainability, data radio bearer retainability, PDU session retainability, upstream and downstream throughput for a network and a network slice, uplink and downlink RAN-UE throughput for a network slice subnet, packet loss for uplink and downlink, patent retransmission for uplink and downlink, E2E uplink and downlink jitter), and mobility (e.g., NG RAN handover success rate, mean time of inter-gNB handover execution of a network slice, successful rate of mobility registration updates of a network slice, 5G to Evolved Packet System handover success rate). The SAPs may also include policies relating to fault management, configuration information, monitoring parameters, and so forth.

The PM data may include similar performance metric parameters as the SAPs and the values associated with the performance metric parameters may be indicative of the past and/or current state of performance at a network device, such as access device 107, core device 112, and network device 120. The FM data may indicate past, current, and/or predictive state at the network device relating to fault detection of events (e.g., latent, manifest, etc.), localization, root cause, and alarms, for example. A fault may relate to a hardware and/or software failure at the virtualized network device and/or host device, a configuration error, a communication link error, a cyberattack, a disaster, and/or environmental factors. Errors may be reported through system alarms. An alarm may be a notification about a specific event that may or may not be an error. According to some exemplary implementations, there may be multiple levels of severity of events and alarms, which may be proprietary or according to a standard (e.g., ITU X.733).

As described herein, according to an exemplary embodiment, the secure OAM for remote networks service may categorize the PM data, the FM data, and other types of data that may contribute to the operation of the virtualized network device, for example. According to some exemplary embodiments, the categorization of the data may be based on the type of application service. For example, an application that automates industrial robots at site 102 may have some or all of the PM data and/or the FM data categorized as critical data in which such data may be subject to the blockchain service of the secure OAM for remote networks service. According to various exemplary implementations, the PM data may relate to user plane traffic and/or the control plane. According to another example, an application that provides reports on weather may have some or none of the PM data and/or the FM data categorized as critical data. According to another exemplary embodiment, the categorization of the data may be based on the type of network slice (e.g., 5QI, etc.). For example, some network slices may be subject to the secure OAM for remote networks service while other network slices may not. According to yet other exemplary embodiments, the categorization of the data may be based on other criteria, such as the end device (e.g., PDU sessions of some end devices may include critical data while other end devices may not). Additionally, critical and non-critical data may be extended to other types of data beyond FM data, PM data, and SAPs, based on customer requirements. For example, UAV flight path information may need to be secured. By way of further example, an AMF that may track mobility of the UAV in correspondence to tracking area identities (TAIs) may be appropriately categorized and subject to the blockchain service. According to another example, the SLA between an operator and a private network may be subject to the blockchain service regarding a network slice and a service use case. In some examples, network devices, such as a UDM, a UDR, a subscription locator function (SLF) may store highly privileged user/common user information, etc., which may be categorized as critical and may be shared among a few out of the many stakeholders in the permissioned blockchain network. According to yet another example, a PCF may make policies for charging that may be categorized as critical between few parties and may be stored in blockchain. In this regard, various types of data, such as UE mobility data, user data, user subscription data, and/or other types of data that an entity may want secured and tamper proof may be appropriately categorized.

Figure 3A:
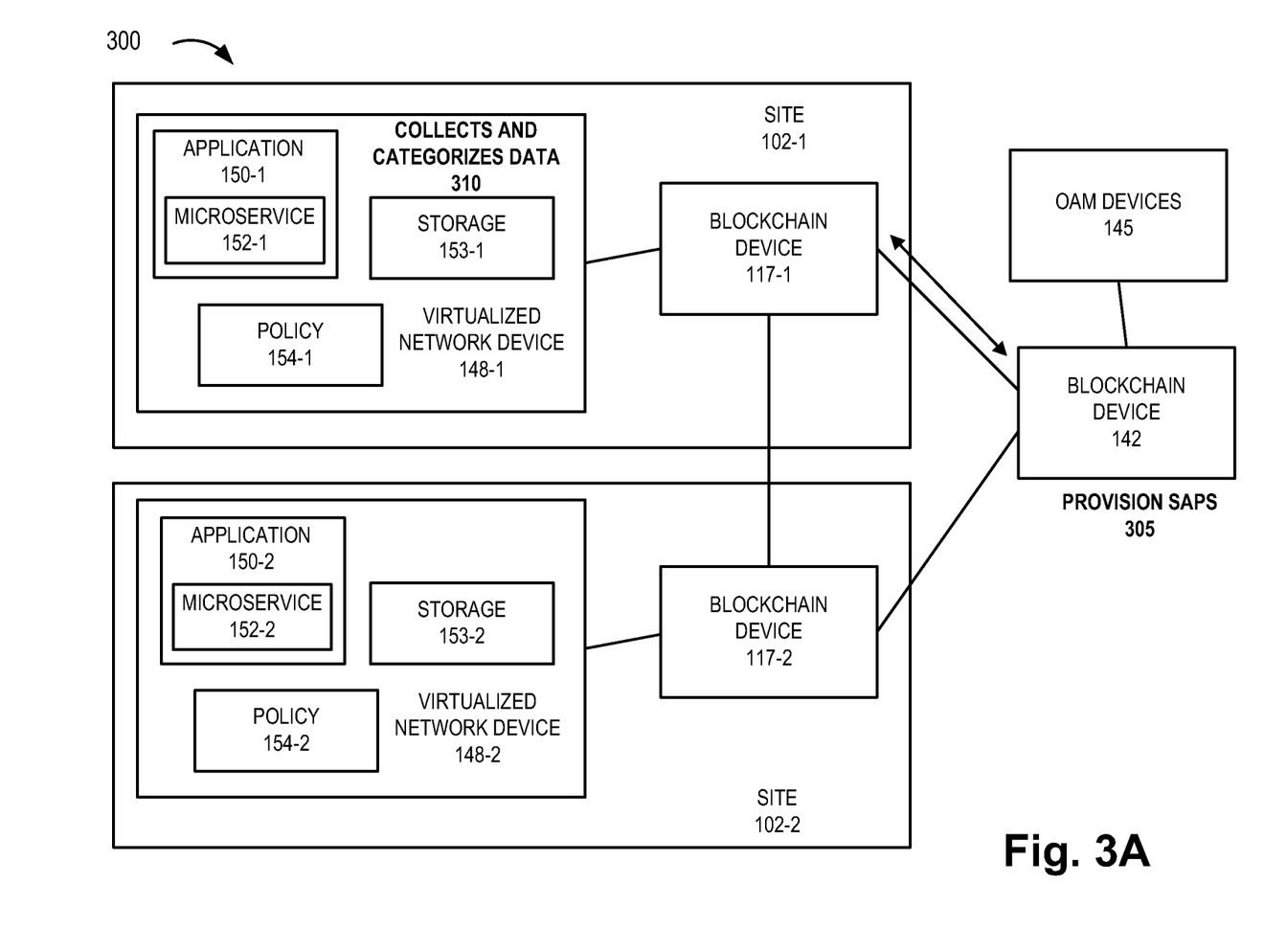
FIGS. 3A-3C are diagrams illustrating an exemplary process of an exemplary embodiment of the secure OAM for remote networks service.
Figure 3B:
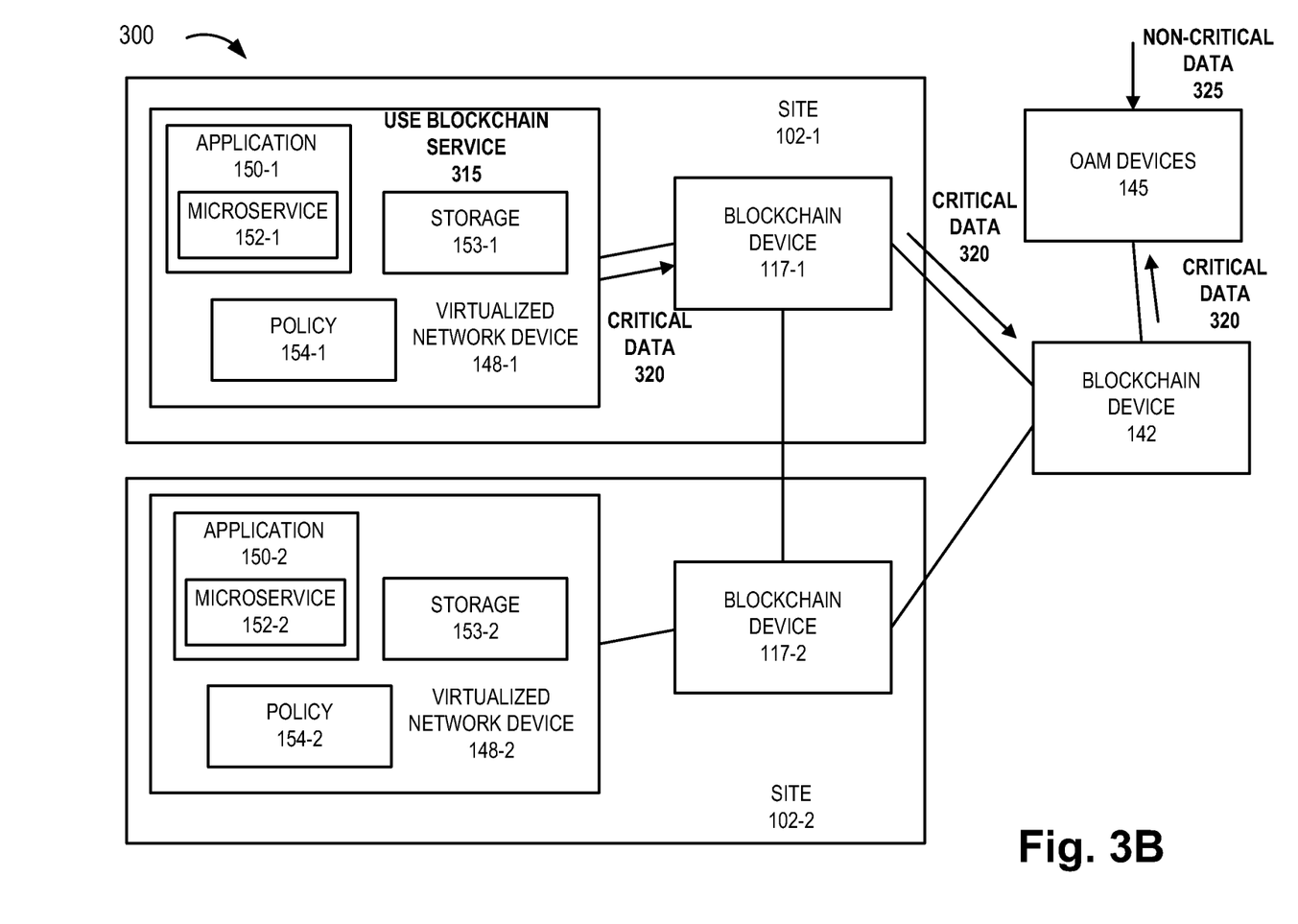

FIGS. 3A-3C are diagrams illustrating an exemplary process 300 of an exemplary embodiment of the secure OAM for remote networks service. As illustrated, process 300 may begin with the provisioning of SAPs 305. The SAPs may be stored in blockchain device 142. Additionally, some of the SAPs, which may include configuration information, may be provisioned at blockchain device 117 of an enterprise or private entity of site 102. The SAPs may be stored as a smart contract. Additionally, for example, some or all of the policies of the SAPs may be categorized as critical (or another type of category that indicates use of the blockchain service). Thereafter, at site 102, end devices (not illustrated) may establish PDU sessions via virtualized network device 148. According to this exemplary scenario, based on the SAPs, assume at virtualized network device 148 (e.g., core device 112), microservice 152 collects and categorizes data 310. For example, the data may include PM data and FM data. Referring to FIG. 3B, according to this exemplary scenario, assume that microservice 152 determines that at least some of the PM data and/or the FM data is critical. Based on this determination, microservice 152 may determine to use the blockchain service 315. For example, microservice 152 may transmit critical data (e.g., critical PM data) to OAM devices 145 via the blockchain network (e.g., blockchain device 117 and blockchain device 142). According to some exemplary scenarios when all the PM data and/or the FM data is not critical, microservice 152 may transmit such non-critical data 325 to OAM devices 145 without using the blockchain service via transport network 125, for example.

Figure 3C:
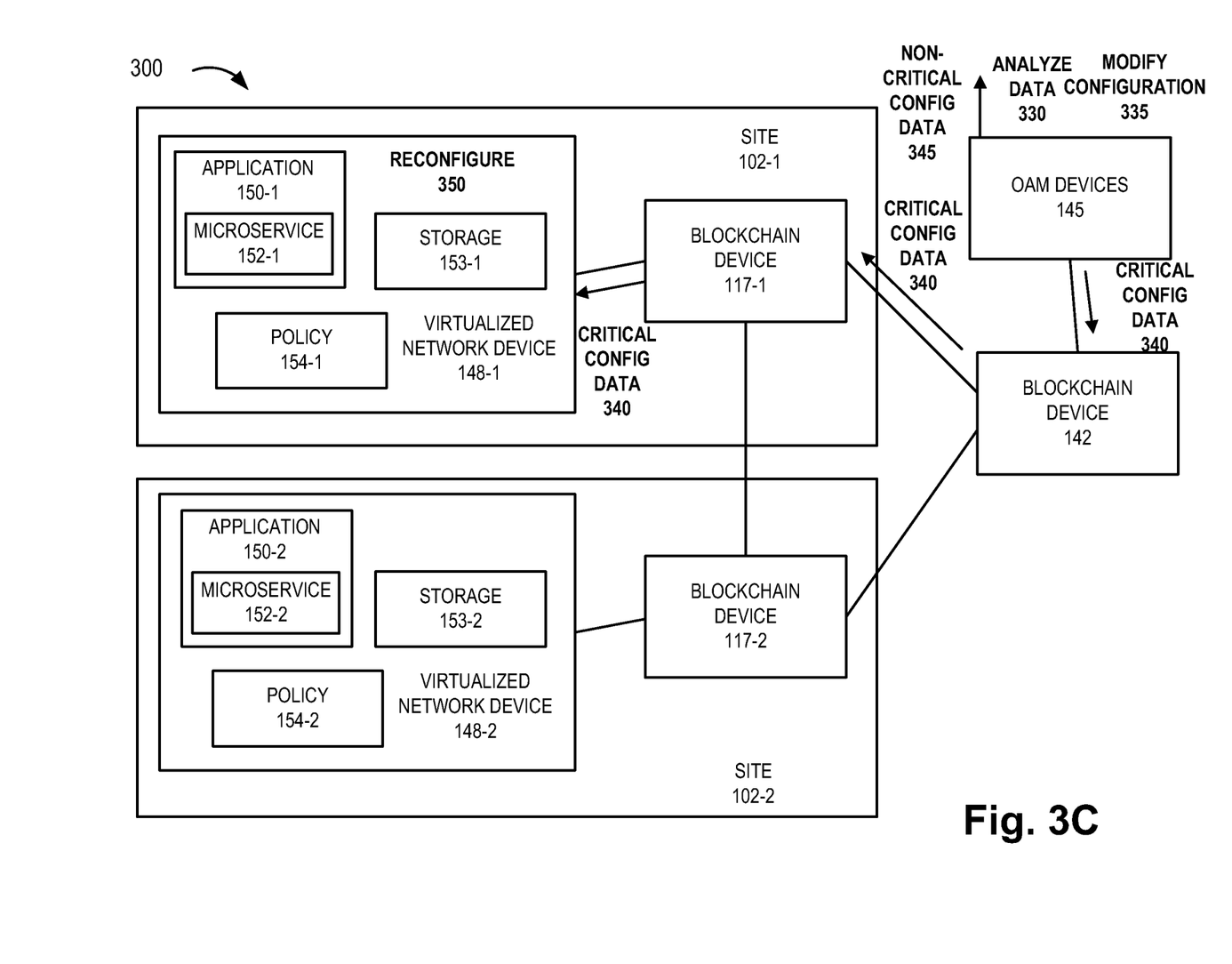

Referring to FIG. 3C, in response to receiving the data, OAM devices 145 may analyze the data 330 and determine whether the configuration of virtualized network device 148 should be modified or not. According to this exemplary scenario, OAM devices 145 may determine to modify a configuration 335 of virtualized network device 148. As illustrated, OAM devices 145 may generate and/or select critical configuration data 340 to be used to modify the configuration of virtualized network device 148. For example, OAM devices 145 may generate and/or select critical configuration data that may enable autoscaling of virtualized network device 148 and/or another type of configuration change, as described herein. OAM device 145 may transmit critical configuration data 340 to virtualized network device 148 via the blockchain network, which includes blockchain device 142 and blockchain device 117. According to some exemplary scenarios, OAM devices 145 may further generate and/or select non-critical configuration data 345 and transmit non-critical configuration data 345 to virtualized network device 148 via transport network 125. Based on the critical configuration data 340 (and in some scenarios non-critical configuration data 345), virtualized network device 148 may be reconfigured 350.

Figure 4:
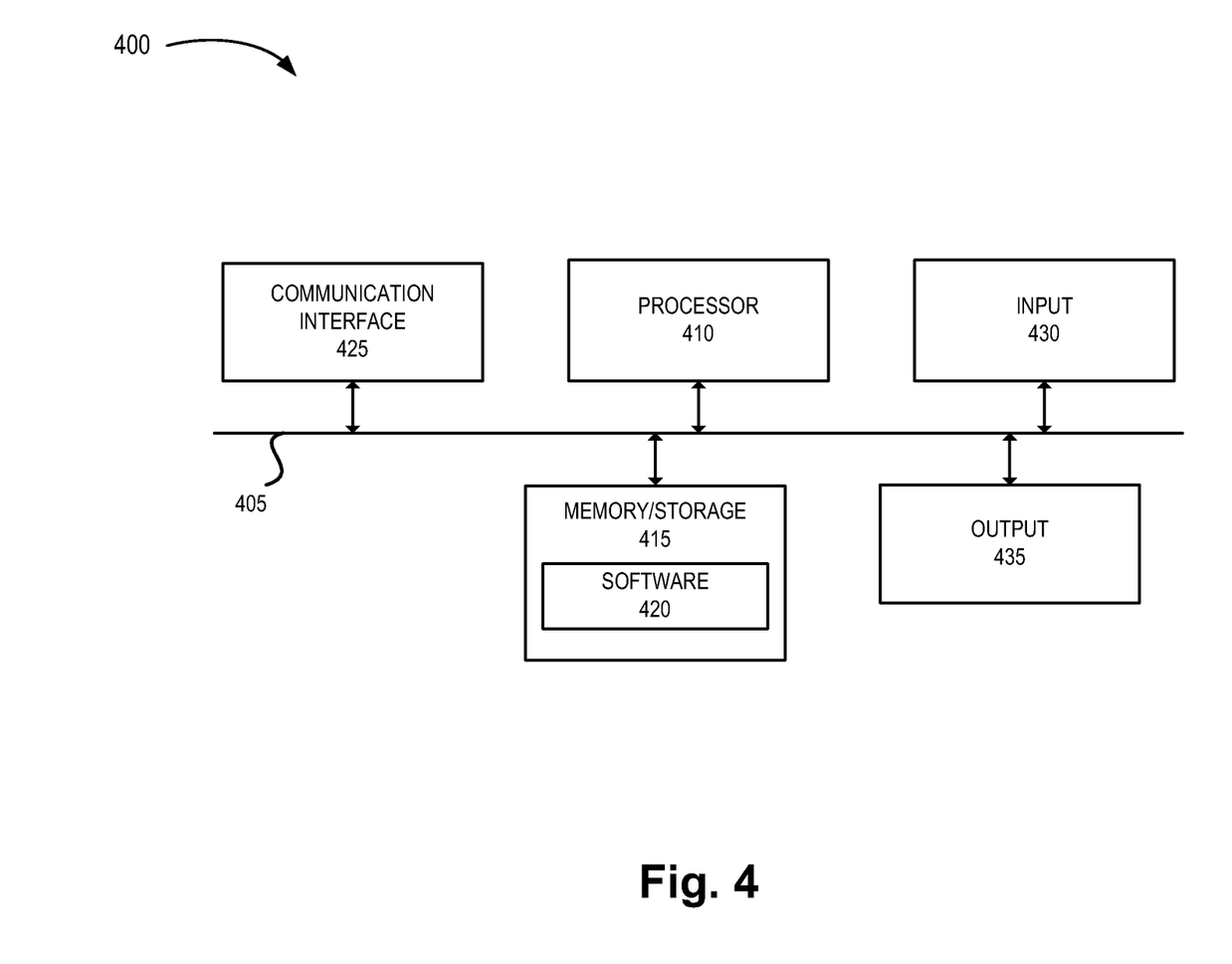
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, core device 112, network device 120, blockchain device 117/142, OAM device 145, end device, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to access device 107, core device 112, and/or network device 120, software 420 may include an application that, when executed by processor 410, provides a function and/or a process of secure OAM for remote networks service, as described herein. Additionally, for example, with reference to OAM device 145, software 420 may include an application that, when executed by processor 410, provides a function and/or a process of secure OAM for remote networks service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or placed in some other operational state during its life cycle (e.g., refreshed, paused, suspended, rebooting, or another type of state or status), using well-known virtualization technologies. For example, access device 107, core device 122, external device 117, and/or another type of network device or end device, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5A:
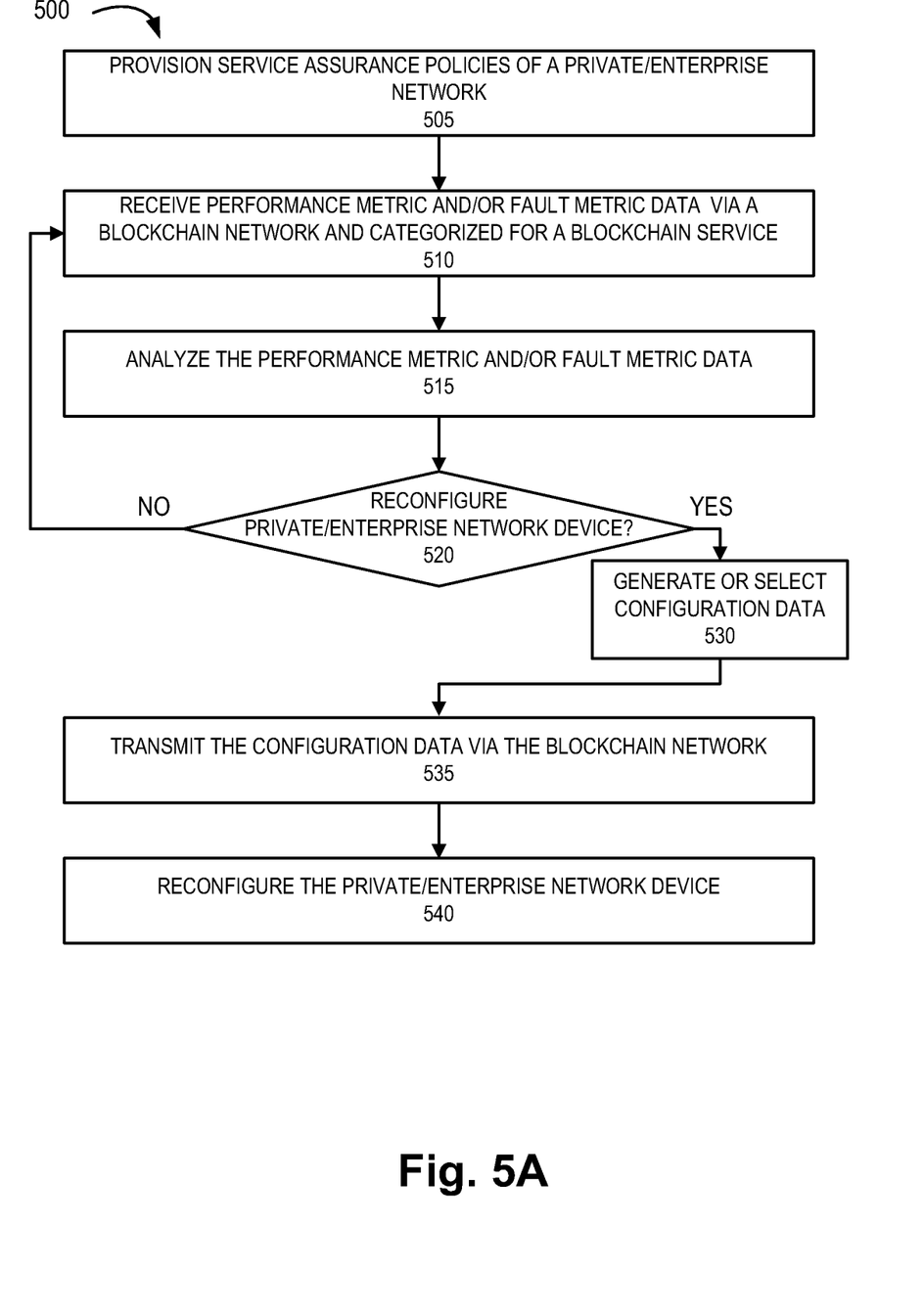
FIG. 5A is a flow diagram illustrating an exemplary process of an exemplary embodiment of the secure OAM for remote networks service.

FIG. 5A is a flow diagram illustrating an exemplary process 500 of an exemplary embodiment of the secure OAM for remote networks service. According to an exemplary embodiment, OAM device 145 may perform a step of process 500. According to an exemplary implementation, processor 410 executes software 420 to perform a step of process 500, as described herein. Alternatively, a step may be performed by execution of only hardware.

In block 505, OAM device 145 may provision service assurance policies of a private/enterprise network. For example, the service assurance policies may be stored as a smart contract in a blockchain network, as described. The service assurance policies may be categorized as critical or non-critical, for example. Additionally, for example, the service assurance policies may indicate PM data and/or FM data as subject to or not subject to a blockchain service (e.g., critical and non-critical data).

In block 510, OAM device 145 may receive performance metric and/or fault metric data via a blockchain network and categorized for a blockchain service. For example, the performance metric and/or fault metric data may include critical data, in whole or in part, and pertain to a private/enterprise network device, such as virtualized network device 148 (e.g., access device 107, core device 112, network device 120). OAM device 145 may also receive non-critical performance metric and/or fault metric data not via the blockchain network, as described herein.

In block 515, OAM device 145 may analyze the performance metric and/or fault metric data. For example, critical performance metric and/or fault metric data may be analyzed in view of critical SAPs, which may be modeled in the form of a smart contract and stored in blockchain device 142. Additionally, for example, non-critical performance metric and/or fault metric data may be analyzed in view of noncritical SAPs, which may be stored at OAM device 145. As an example, the noncritical SAPs may be modeled in ETSI or Open Network Automation Platform (ONAP) compliant modeling language. In block 520, based on the analysis, OAM device 145 may determine whether to reconfigure the private/enterprise network device. For example, OAM device 145 may compare an SLA requirement of the service assurance policies to the performance metric data. According to another example, OAM device 145 may determine whether an event or fault requires an action.

When OAM device 145 determines to not reconfigure the private/enterprise network device (block 520—NO), process 500 may return to block 510. For example, OAM device 145 may wait for the next reception of performance metric and/or fault metric data.

When OAM device 145 determines to reconfigure a private/enterprise network device (block 520—YES), OAM device 145 may generate or select configuration data (block 530). For example, the configuration data may reconfigure the private/enterprise network device so as to address a performance deficiency and/or attempt to remediate an error or event.

In block 535, OAM device 145 may transmit the configuration data via the blockchain network. For example, OAM device 145 may transmit configuration data (e.g., designated as critical) to the private/enterprise network device via blockchain device 142 and blockchain device 117. OAM device 145 may transmit configuration data (e.g., non-critical data) to the private/enterprise network device not via the blockchain service (e.g., transport network 125).

In block 540, the private/enterprise network device may be reconfigured. For example, the private/enterprise network device may be reconfigured based on the configuration data.

FIG. 5A illustrates an exemplary process 500 of the secure OAM for remote networks service, according to other exemplary embodiments, the secure OAM for remote networks service may perform additional operations, fewer operations, and/or different operations than those illustrated and described.

Figure 5B:
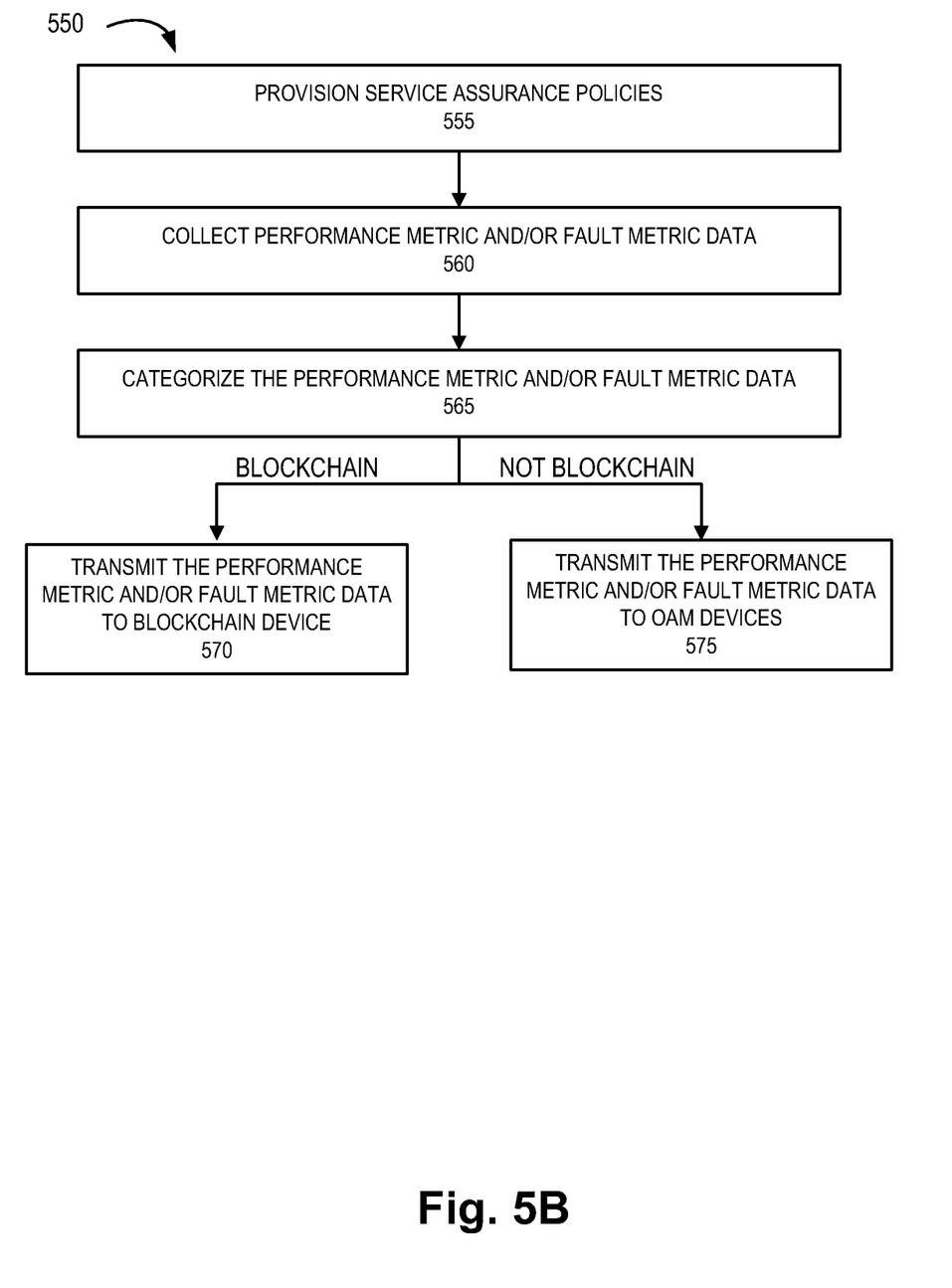
FIG. 5B is a flow diagram illustrating another exemplary process of an exemplary embodiment of the secure OAM for remote networks service.

FIG. 5B is a flow diagram illustrating an exemplary process 550 of an exemplary embodiment of the secure OAM for remote networks service. According to an exemplary embodiment, virtualized network device 148 may perform a step of process 550. For example, virtualized network device 148 may be implemented as access device 107, core device 112, or network device 120, as described herein. According to exemplary implementations, virtualized network device 148 includes microservice 152 or sidecar/agent 155 that may perform the step. According to an exemplary implementation, processor 410 executes software 420 to perform a step of process 550, as described herein. Alternatively, a step may be performed by execution of only hardware.

In block 555, virtualized network device 148 may provision service assurance policies. For example, virtualized network device 148 may store and use monitoring parameters of policy 154.

In block 560, virtualized network device 148 may collect performance metric and/or fault metric data. For example, virtualized network device 148 may collect performance metric and/or fault metric data during its operation. Virtualized network device 148 may store the collected performance and/or fault metric data in storage 153.

In block 565, virtualized network device 148 may categorize the performance metric and/or fault metric data. For example, virtualized network device 148 may categorize some or all of the performance metric and/or fault metric data as critical data (or another nomenclature subject to the blockchain service). Additionally, or alternatively, virtualized network device 148 may categorize some or all of the performance metric and/or fault metric data as non-critical data (or another nomenclature not subject to the blockchain service).

In blocks 570 and 575, virtualized network device 148 may transmit performance metric data and/or fault metric data in which the performance metric and/or fault metric data subject to the blockchain service may be transmitted to a blockchain device (block 570) and the performance metric and/or fault metric data not subject to the blockchain service may be transmitted to OAM device 145 and not via the blockchain network, as described herein.

FIG. 5B illustrates an exemplary process 550 of the secure OAM for remote networks service, according to other exemplary embodiments, the secure OAM for remote networks service may perform additional operations, fewer operations, and/or different operations than those illustrated and described. For example, blockchain device 142 may subscribe to critical PM, FM, and/or other types of data, as described herein. Critical SAP outcomes may be subscribed by OAM device 145 and/or virtualized network device 148. Virtualized network device 148 may be modified or reconfigured by OAM device 145 or virtualized network device 148. OAM device 145 may also subscribe to noncritical data, as described herein. Noncritical outcomes may similarly be subscribed to by OAM device 145 and/or virtualized network device 148. Virtualized network device 148 may be modified or reconfigured by OAM device 145 or virtualized network device 148.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, a series of blocks have been described regarding the processes illustrated in FIGS. 5A and 5B, however, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
provisioning, by a network device of an operator network, service assurance policies pertaining to orchestration and management of virtualized network devices of a remote private network as a smart contract via a blockchain network;
receiving, by the network device from a virtualized network device of the virtualized network devices of the remote private network and via the blockchain network, at least one of first performance metric data or first fault metric data pertaining to an operation of the virtualized network device that is categorized for transmission via the blockchain network;
analyzing, by the network device, the at least one of first performance metric data or first fault metric data;
generating, by the network device based on the analyzing, configuration data that reconfigures the virtualized network device and is categorized for transmission to the virtualized network device via the blockchain network; and
transmitting, by the network device via the blockchain network, the configuration data to the virtualized network device.

2. The method of claim 1, further comprising:
receiving, by the network device from the virtualized network device and not via the blockchain network, at least one of second performance metric data or second fault metric data pertaining to the virtualized network device that is not categorized for transmission via the blockchain network.

3. The method of claim 1, wherein the at least one of first performance metric data or first fault metric data is categorized for transmission via the blockchain network by the virtualized network device.

4. The method of claim 1, wherein the virtualized network device includes a microservice or a sidecar that categorizes the at least one of first performance metric data or first fault metric data.

5. The method of claim 1, further comprising:
determining, by the network device based on the analysis, whether to reconfigure the virtualized network device.

6. The method of claim 1, wherein the at least one of first performance metric data or first fault metric data is categorized for transmission via the blockchain network based on a type of application service or a type of network slice associated with a packet data unit session to which the at least one of first performance metric pertains.

7. The method of claim 1, wherein the virtualized network device is a radio access network device or a core network device.

8. The method of claim 1, wherein the network device is of an operations, administration, and maintenance system.

9. A network device comprising:
a processor that is configured to:
provision service assurance policies pertaining to orchestration and management of virtualized network devices of a remote private network as a smart contract via a blockchain network, wherein the network device is of an operator network;
receive from a virtualized network device of the virtualized network devices of the remote private network and via the blockchain network, at least one of first performance metric data or first fault metric data pertaining to an operation of the virtualized network device that is categorized for transmission via the blockchain network;
analyze the at least one of first performance metric data or first fault metric data;
generate, based on the analysis, configuration data that reconfigures the virtualized network device and is categorized for transmission to the virtualized network device via the blockchain network; and transmit the configuration data to the virtualized network device via the blockchain network.

10. The network device of claim 9, wherein the processor is further configured to:

receive, from the virtualized network device and not via the blockchain network, at least one of second performance metric data or second fault metric data pertaining to the virtualized network device that is not categorized for transmission via the blockchain network.

11. The network device of claim 9, wherein the at least one of first performance metric data or first fault metric data is categorized for transmission via the blockchain network by the virtualized network device.

12. The network device of claim 9, wherein the virtualized network device includes a microservice or a sidecar that categorizes the at least one of first performance metric data or first fault metric data.

13. The network device of claim 9, wherein the processor is further configured to:

determine, based on the analysis, whether to reconfigure the virtualized network device.

14. The network device of claim 9, wherein the at least one of first performance metric data or first fault metric data is categorized for transmission via the blockchain network based on a type of application service or a type of network slice associated with a packet data unit session to which the at least one of first performance metric pertains.

15. The network device of claim 9, wherein the virtualized network device is a radio access network device or a core network device.

16. The network device of claim 9, wherein the network device is of an operations, administration, and maintenance system.

17. A non-transitory computer-readable storage medium storing instructions executable by a processor of a network device of an operator network, wherein the instructions are configured to:

provision service assurance policies pertaining to orchestration and management of virtualized network devices of a remote private network as a smart contract via a blockchain network, wherein the network device is of an operator network;

receive from a virtualized network device of the virtualized network devices of the remote private network and via the blockchain network, at least one of first performance metric data or first fault metric data pertaining to an operation of the virtualized network device that is categorized for transmission via the blockchain network;

analyze the at least one of first performance metric data or first fault metric data;

generate, based on the analysis, configuration data that reconfigures the virtualized network device and is categorized for transmission to the virtualized network device via the blockchain network; and transmit the configuration data to the virtualized network device via the blockchain network.

18. The non-transitory computer-readable storage medium of claim 17, wherein the at least one of first performance metric data or first fault metric data is categorized for transmission via the blockchain network based on a type of application service or a type of network slice associated with a packet data unit session to which the at least one of first performance metric pertains.

19. The non-transitory computer-readable storage medium of claim 17, wherein the virtualized network device is a radio access network device or a core network device.

20. The non-transitory computer-readable storage medium of claim 17, wherein the virtualized network device includes a microservice or a sidecar that categorizes the at least one of first performance metric data or first fault metric data.

* * * * *